United States Patent [19]
Kawakami

[11] Patent Number: 5,504,806
[45] Date of Patent: Apr. 2, 1996

[54] COMMUNICATION APPARATUS

[75] Inventor: Yukito Kawakami, Fukuoka, Japan

[73] Assignee: Matsushita Electric Industrial Co., Ltd., Japan

[21] Appl. No.: 339,239

[22] Filed: Nov. 10, 1994

[30] Foreign Application Priority Data

Nov. 12, 1993 [JP] Japan ................................. 5-282984

[51] Int. Cl.⁶ ............................................... H04M 1/64
[52] U.S. Cl. ........................... 379/67; 379/100; 379/88; 379/68
[58] Field of Search ................................ 379/67, 88, 89, 379/68, 77, 100; 395/500; 369/53; 370/62

[56] References Cited

U.S. PATENT DOCUMENTS

| | | | |
|---|---|---|---|
| 3,716,676 | 2/1973 | Tatematsu et al. | 379/356 |
| 4,549,047 | 10/1985 | Brian et al. | 379/88 |
| 4,982,420 | 1/1991 | Theis | 379/68 |
| 5,003,576 | 3/1991 | Helferich | 379/88 |
| 5,142,527 | 8/1992 | Barbier et al. | 379/88 |
| 5,161,143 | 11/1992 | Fukushima et al. | 369/53 |
| 5,218,691 | 6/1993 | Tuma et al. | 395/500 |
| 5,313,516 | 5/1994 | Afshar et al. | 379/88 |
| 5,375,166 | 12/1994 | Odaohara | 379/88 |
| 5,388,146 | 2/1995 | Morduch et al. | 379/88 |

*Primary Examiner*—Jeffery Hofsass
*Assistant Examiner*—Scott Wolinsky
*Attorney, Agent, or Firm*—Parkhurst, Wendel & Burr

[57] ABSTRACT

A communication apparatus comprising a RAM having a back up power source; a recording/reproducing portion having a flash EEPROM, for recording at least a piece of information in the EEPROM having a plurality of sectors and for reproducing the information stored therein, each sector having a sector number and a given capacity and being independently erasable; and a recording control portion, responsive to a ring signal from a telephone line or a command signal, for receiving the information, detecting a data amount of the received information, for storing the information in at least one sector, for detecting a sector number of the at least one sector used to store the control data in accordance with the detected data amount, and for storing the detected sector number in the RAM. This apparatus may further comprise a ring signal detector for producing the command signal in response to a ring signal from a telephone line; and an I/F circuit responsive to the command signal for communicating with the telephone line; or a reproducing controller for selectively reproducing information from the EEPROM using the sector numbers stored in the RAM; or an erasing control portion for selectively erasing recorded information in the EEPROM using the sector numbers stored in the RAM. The information may include sound or image information.

33 Claims, 7 Drawing Sheets

FIG. 4
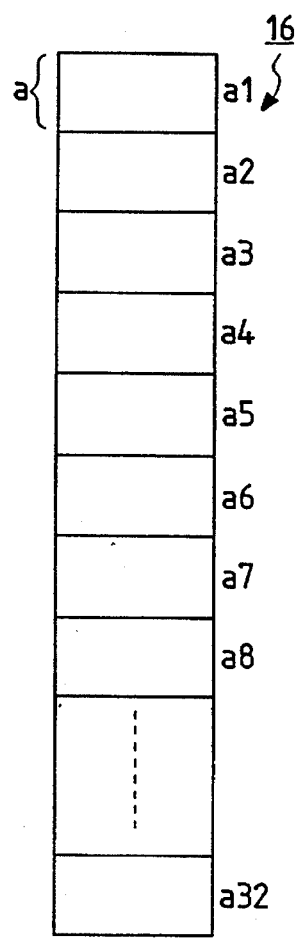
FIG. 5
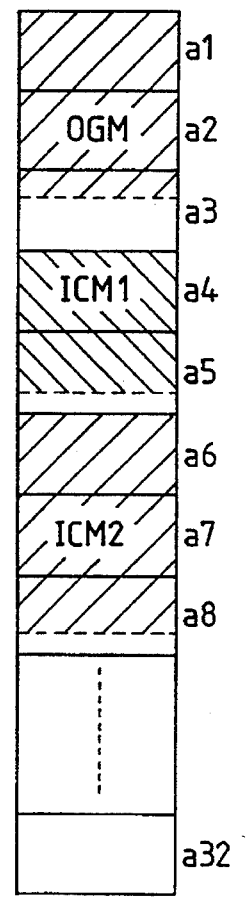
FIG. 6
| | SECTOR NO. | | | | |
|---|---|---|---|---|---|
| OGM | 1 | 2 | 3 | — | — |
| ICM1 | 4 | 5 | — | — | — |
| ICM2 | 6 | 7 | 8 | — | — |
| ICM3 | — | — | — | — | — |
| ⋮ | | ⋮ | | | |

COMMUNICATION APPARATUS

BACKGROUND OF THE INVENTION

1. Field of the Invention

This invention relates to a communication apparatus for sending information to a caller and for recording information from the caller through a communication line and to a communication apparatus for providing information to an operator and for recording information from the operator.

2. Description of the Prior Art

An automatic telephone answering apparatus as communication apparatus, having a digital memory unit, for sending an out-going message to a caller and for recording an incoming message from the caller through a telephone line is known. A first prior art of telephone answering apparatus, having a ROM (read only memory) as the digital memory unit, is disclosed in Japanese patent application provisional publication No. 2-209056.

This first prior art of telephone apparatus comprises a ROM for storing an out-going message and a d/a converter for converting a digital sound signal indicative of the out-going message to an analog signal. This telephone apparatus sends a predetermined out-going message stored in the ROM to the caller through the d/a converter in response to a call.

A second prior art of a sound signal recording and reproducing apparatus is disclosed in Japanese patent application provisional publication No. 5-189000. This prior art sound signal recording and reproducing apparatus once stores an analog sound signal from a microphone through a/d converting in a DRAM (dynamic random access memory). The stored sound signal is transferred to a flash EEPROM (electrically erasable, programmable read-only memory) to store the digital sound signal. The digital sound signal in the flash EEPROM is once transferred to the DRAM and then, the flash EEPROM is erased. A part of the digital sound signal is transferred to the flash EEPROM to edit the digital sound signal such as an answering message. However, in this prior art sound signal recording and reproducing apparatus, there is a problem that the DRAM should have a large capacity.

SUMMARY OF THE INVENTION

The aim of this invention is to provide an improved communication apparatus and an improved communication apparatus.

According to the present invention there is provided a first communication apparatus comprising: a volatile memory, such as a RAM, for storing data; a back up power source for maintaining the data in the volatile memory in presence and absence of an external supply power; a recording and reproducing portion, having a non-volatile semiconductor memory, such as a flash EEPROM, for recording at least a piece of information in the non-volatile semiconductor memory and for reproducing the information stored in the non-volatile semiconductor memory, the non-volatile semiconductor memory having a plurality of sectors, each having a sector number and a predetermined capacity and being erasable independently; and a recording control portion responsive to a command signal, such as a ring signal sent from a telephone line, or a manual command signal, for receiving the information, detecting a data amount of the received information, for operating the recording and reproducing portion to store the information in at least one of the sectors, for detecting at least a sector number of the at least one of the sectors used to store the information in accordance with the detected data amount, and for storing the detected at least sector number in the volatile memory.

The first communication apparatus may further comprise: a ring signal detection circuit for producing the command signal in response to a ring signal sent from a telephone line; and an interface circuit responsive to the command signal for communicating with a communication line, such as a telephone line, to receive and send the information. In the first apparatus, the recording and reproducing portion further comprises an analog to digital converter for recording the information through analog to digital converting by the analog to digital converter in the non-volatile semiconductor memory and a digital to analog converter for reproducing the information stored in the non-volatile semiconductor memory through digital to analog converting by the digital to analog converter. The first apparatus may further comprise: a reproducing control portion responsive to a reproducing command signal including data indicative of the information to be reproduced for operating the recording and reproducing portion to reproduce the information from the non-volatile semiconductor memory in accordance with the sector numbers stored in the volatile memory and the reproducing command signal. The information may include an out-going sound message, an incoming sound message, out-going data message, incoming data message, out-going image information, or incoming image information. The first apparatus may further comprise: an erasing control portion responsive to an erasing command signal including information indicative of the information to be erased for erasing the information to be erased in the non-volatile semiconductor memory in accordance with the sector numbers stored in the volatile memory and the information.

According to the present invention there is also provided a second communication apparatus comprising: a volatile memory, such as a RAM, for storing data, such as sector number; a back up power source for maintaining the data in the volatile memory in presence and absence of an external supply power; a recording and reproducing portion, having a non-volatile semiconductor memory, such as a flash EEPROM, for recording at least a piece of information, i.e., sound or image information or the like, in the non-volatile semiconductor memory and for reproducing the information stored in the non-volatile semiconductor memory, the non-volatile semiconductor memory having a plurality of sectors, each having a sector number and a predetermined capacity and being erasable independently; and a recording control portion responsive to a command signal for receiving the information, for detecting a data amount of the received information, for operating the recording and reproducing portion to store the information in one of sectors such that the information is recorded in the non-volatile semiconductor memory from an end address to another end address of one of the sectors, for detecting at least a sector number of the at least one of the sectors used to store the information in accordance with the detected data amount, and for storing the detected at least sector number in the volatile memory.

According to the present invention there is also provided a third apparatus comprising: a recording and reproducing portion, having a non-volatile semiconductor memory, for recording information, i.e., sound or image information or the like, and control data in the non-volatile semiconductor memory, and for reproducing the information stored in the non-volatile semiconductor memory, the non-volatile semiconductor memory having a plurality of sectors, each having a sector number and a predetermined capacity; and a recording control portion responsive to a command signal for receiving the information, for detecting a data amount of the received information, for operating the recording and reproducing portion to store the information in at least one of the sectors except a predetermined sector of the sectors, for detecting at least a sector number of the at least one of the sectors used to store the information in accordance with the detected data amount, and for storing the detected at least sector number in the predetermined sector as the data.

According to the present invention there is further provided a fourth communication apparatus comprising: a recording and reproducing portion, having a non-volatile semiconductor memory, for recording information, i.e., sound or image information or the like, and control data in the non-volatile semiconductor memory, and for reproducing the information stored in the non-volatile semiconductor memory, the non-volatile semiconductor memory having a plurality of sectors, each having a sector number and a predetermined capacity and being erasable independently; and a recording control portion responsive to a command signal for receiving the information, for detecting a data amount of the received information, for operating the recording and reproducing portion to store the information in at least one of the sectors except at a predetermined area of a predetermined sector of the sectors, for detecting at least a sector number of the at least one of the sectors used to store the information in accordance with the detected data amount, and for storing the detected at least sector number in the predetermined sector at the predetermined area as the data as the data.

The fourth communication apparatus may further comprise: a volatile memory for storing the data and an erasing control portion responsive to an erasing command signal for copying the information and the sector numbers from the predetermined sector into the volatile memory, for determining the sector numbers for the information to be erased and erasing the information in the non-volatile semiconductor memory using the determined sector number, and for copying a portion of the information stored in the predetermined sector and the sector numbers from the volatile memory except the determined sector number.

BRIEF DESCRIPTION OF THE DRAWINGS

The objects and features of the present invention will become more readily apparent from the following detailed description taken in conjunction with the accompanying drawings in which:

FIG. 4 is an illustration of this embodiment showing recording units;

FIG. 5 is an illustration of this embodiment showing a recording condition of the flash EEPROM shown in FIG. 1;

FIG. 6 is an illustration of this embodiment showing data stored in the RAM shown in FIG. 1;

The same or corresponding elements or parts are designated with like references throughout the drawings.

DETAILED DESCRIPTION OF THE INVENTION

Hereinbelow will be described a first embodiment of this invention.

Figure 1:
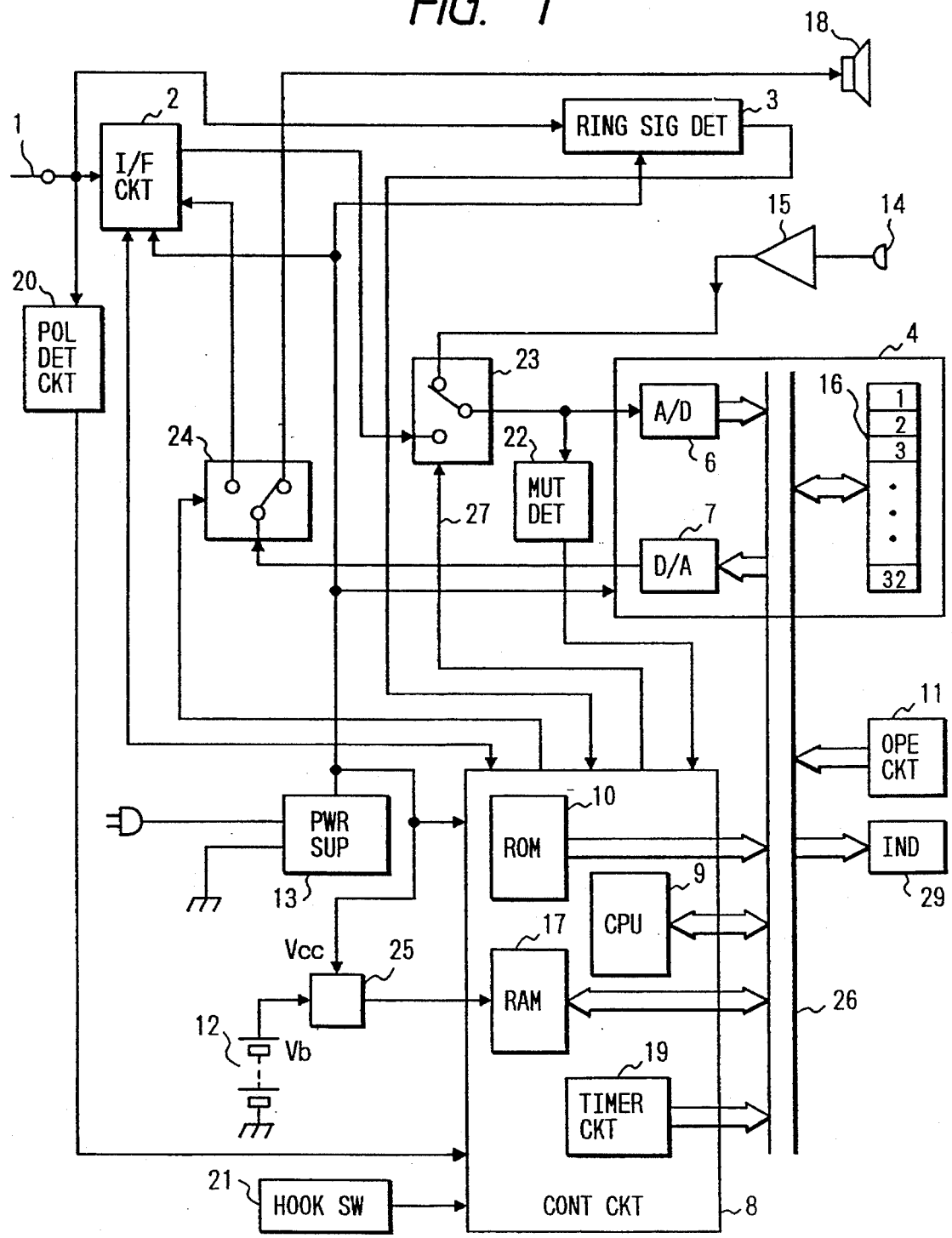
FIG. 1 is a block diagram of the embodiment of an automatic telephone answering apparatus.

FIG. 1 is a block diagram of the embodiment of an automatic telephone answering apparatus. The automatic telephone answering apparatus comprises a control circuit 8 having a central processor (cpu) 9, a ROM (read-only memory) 10, a RAM (random access memory) 17, and a timer circuit 19, an interface circuit 2 for communicating with an external telephone through a telephone line 1, a ring signal detection circuit 3 for detecting a ring signal included in a telephone signal sent through the telephone line 1, a message recording and reproducing circuit 4 for recording an out-going message and incoming messages and for reproducing the out-going message and each of incoming messages, a microphone 14 for receiving an out-going message and supplying it to the recording and reproducing circuit 4 through an amplifier 15 and a switch 23, a speaker 18 for reproducing an incoming message and out-going message from the recording and reproducing circuit 4, an operation circuit 11 for inputting respective commands to the cpu 9, an indicator 29 for indicating operational information and the number of incoming messages received, a polarity detection circuit 20 for detecting a termination of communication by detecting a polarity of the telephone line 1, a mute detection 22 for detecting a muting condition of a sound signal to be inputted to the recording and reproducing circuit 4, a power supply circuit 13 for generating adc supply voltage Vcc to respective circuits in this apparatus, such as the interface circuit 2, the recording/reproducing circuit 4, and the control circuit 8, a backup circuit 25 for supplying the dc supply voltage Vcc or a battery supply voltage Vb from a battery 12, the switch 23 for supplying a sound signal from the microphone 14 or the interface circuit 2 to the recording and reproducing circuit 4, and a switch 24 for supplying the out-going message to the interface circuit 2 or the speaker 18 and supplying the incoming message and the out-going message to the speaker 18 from the recording and reproducing circuit 4.

In the control circuit 8, the ROM 10 stores a program for operating this apparatus, the RAM 17 stores data for operating this apparatus, the timer circuit 19 for measuring a time interval necessary for the operation of this apparatus. The interface circuit 2 communicates with a telephone through a telephone line 1, that is, receives and sends incoming and out-going telephone signal including incoming and out-going sound signals respectively. The ring signal detection circuit 3 detects the incoming ring signal from the telephone line 1 and supplies a detected ring signal to the control circuit 8. The message recording and reproducing circuit 4 comprises an a/d converter 6 for converting the sound signal from the switch 23, that is, the incoming sound signal from the interface circuit or the out-going message from the microphone 14, a flash EEPROM 16 (electrically erasable, programmable read-only memory) for recording an out-going message and incoming messages, and a d/a converter 7 for reproducing the out-going message and each of incoming messages in cooperation with the flash EEPROM 16. The a/d converter 6, the d/a converter 7, and the flash EEPROM 16, the operation circuit 11, the ROM 11, the RAM 17, the timer circuit 19 are communicates with the cpu 9 through a bus line 26.

The microphone 14 is used for inputting an out-going message to the recording and reproducing circuit 4 through the amplifier 15 wherein the switch 23 is operated to send the incoming message to the recording and reproducing circuit 4 in response to a first switch control signal 27 from the control circuit 8 in an out-going message recording mode indicated by the operation circuit 11. The speaker 18 is used for reproducing an incoming message and out-going message from the recording and reproducing circuit 4 in an incoming message listening mode and an out-going check mode indicated by the operation circuit 11 respectively. The operation circuit 11 is used for making this apparatus in either of the out-going message recording mode, out-going message checking mode, the incoming message listening mode, an erasing mode, an automatic answering mode, a telephone mode, or the like. In the erasing mode, the control circuit 8 erases the out-going message or each of incoming message in the flash EEPROM 16 selectively. In the telephone mode, this apparatus is capable of a normal telecommunication with a handset (not shown) through the telephone line 1 with an external telephone via the interface circuit 2.

The polarity detection circuit 20 detects a termination of communication by detecting a change in the polarity of the telephone line 1. The mute detection 22 detects a muting condition of a sound signal to be inputted to the recording and reproducing circuit 4 to detect a termination of recording the out-going message and a termination of inputting an incoming message.

The backup circuit (source) 25 supplies the dc supply voltage Vcc to the RAM 17 in an operation condition of this apparatus and supplies the battery supply voltage Vb from the battery 12 to the RAM 17 in a power fail condition or a non-operation condition of this apparatus.

The switch 23 supplies the sound signal from the microphone 14 to the recording and reproducing circuit 4 in the out-going message recording mode and supplies the sound signal from the interface circuit 2 to the recording and reproducing circuit 4 in the incoming message recording mode in response to the first switch control signal 27 from the control circuit 8 generated in response to the operation circuit 11.

The switch 24 supplies the out-going message to the interface circuit 2 in the out-going message reproducing mode in response to a second switch control signal when the ring signal detection circuit 3 detects the ring signal in the automatic answering mode indicated by the operation circuit 11 and supplies the out-going message and each of incoming messages to the speaker 18 in the out-going message checking mode and the incoming message listing mode respectively.

The operation circuit 11 includes a twelve-key for dialing (not shown) and function keys (not shown) for indicating the out-going message recording mode, the out-going message checking mode, the incoming message listing mode, and the erasing mode or the like.

FIG. 4 is an illustration of this embodiment showing recording units, i.e., sectors, of the EEPROM 16 shown in FIG. 1. The flash EEPROM 16 includes thirty-two sectors a1 to a32. Data stored in the flash EEPROM 16 can be erased every sector. FIG. 6 is an illustration of this embodiment showing data stored in the RAM 17 shown in FIG. 1. The RAM 17 stores operational data necessary for operation of the CPU 9 and recording condition data indicative of sectors in use. More specifically, an out-going message (OGM) is recorded in the first to third sectors a1 to a3, a first incoming message (ICM1) is stored in the fourth and fifth sectors a4 and a5, a second incoming message (ICM2) is recorded in the sixth to eighth sectors a6 to a8, and a third incoming message (ICM3) has not been recorded in any recording units in fact. Therefore, a number other than one to thirty-two is written in the sector number data as shown in FIG. 6 for the third incoming message.

The RAM 17 maintains the operational data and particularly the recording condition data shown in FIG. 6 in the presence and in the absence of an external power supply. That is, in the power fail condition and in the non-operation condition, the backup circuit 25 and the battery 12 supplies a dc power from the battery 12. In other words, the battery 12 and the backup circuit 25 act as a backup power source.

FIG. 5 is an illustration of this embodiment showing a recording condition of the flash EEPROM shown in FIG. 1, represented by the recording condition data shown in FIG. 6. In FIG. 6, the out-going message (OGM) is recorded in the first to third sectors a1 to a3, the first incoming message (ICM1) is stored in the fourth and fifth sectors a4 and a5, the second incoming message (ICM2) is recorded in the sixth to eighth sectors a6 to a8 as shown. Though the former message is recorded up to an intermediate address of a sector, the next message is recorded from the beginning address of the next sector.

An operation in the out-going message recording mode will be described.

Figure 2:
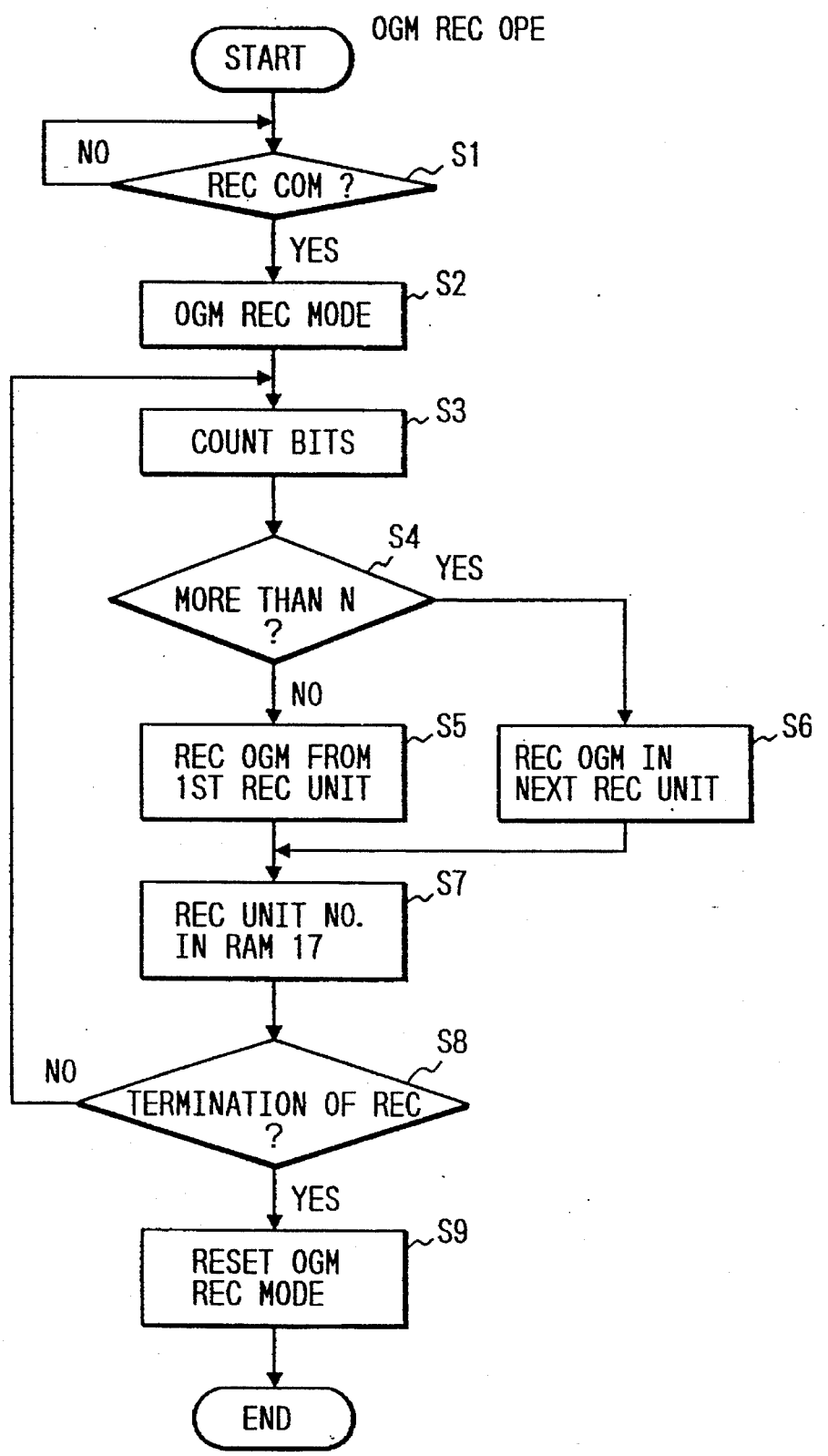
FIG. 2 shows a flow chart of this embodiment showing a program of the out-going message recording operation.

The ROM 10 stores programs for operations of this apparatus. FIG. 2 shows a flow chart of this embodiment showing a program of the out-going message recording operation.

In the first step s1, a decision is made as to whether or not an out-going message recording command indicative of the out-going message recording mode is inputted from the operation circuit 11. If the answer is NO, processing loops there. If the answer is YES, processing proceeds to step s2, that is, if there is the out-going recording command, the cpu 9 sets the apparatus in the out-going message recording mode. More specifically, the control circuit 8 turns the switch 23 to the side of the microphone 14 and starts the timer circuit 19. In the following step s3, the cpu 9 counts up the number of bits indicating that data has been recorded. In the following step s4, the cpu 9 makes a decision as to whether or not the counted number exceeds a predetermined number N which corresponding to the capacity of one sector a. If the counted number does not exceeds the predetermined number N processing proceeds to step s5. In step s5, the cpu 9 stores the sound data indicative of an out-going message from the a/d converter 6 in the first sector of the flash EEPROM 16.

In step s4, if the counted number exceeds the predetermined number N processing proceeds to step s6 or the counted number corresponds to the predetermined number N, i.e., the counted number reaches an integer times N. In step s6, the cpu 9 stores the sound data indicative of an out-going message from the a/d converter 6 in the next sector of the flash EEPROM 16.

After step s5 or s6, the cpu 9 stores the sector number used to store the message in the RAM 17 in step s7. In the following step s8, a decision is made as to whether or not the inputting of the out-going message has been finished by checking the mute detection circuit 22, the operation circuit 11, the timer circuit 19, and the hook switch 21. The mute detection circuit 22 supplies a mute detection signal when a muted condition in the sound signal from the switch 23 for a first predetermined interval, for example five seconds. In response to the mute detection signal, the cpu 9 judges the condition as the termination of recording. If the time interval measured by the timer circuit 19 exceeds a second predetermined interval, the cpu 9 judges the condition as the termination of recording also. Further, the operation circuit 11 receives a command for finishing the recording of the out-going message from the user, the cpu 9 judges the condition as the termination of recording also. Moreover, if the hook switch 21 is in the off-hook condition, the cpu 9 judges the condition as the termination of recording. That is, if there is a calling, the recording of the out-going message should be finished to receive the call. The cpu 9 judges the termination of the recording the out-going message either of these conditions. If the recording of the out-going message has not been finished. Processing returns to step s3.

In step s8, the cpu judges the condition as the termination of the recording of out-going message, processing proceeds to step s9 and the cpu 9 resets the out-going message recording mode, namely, the switch 23 is turned to the side of the interface circuit 2 and resets the timer circuit 19.

Figure 3:
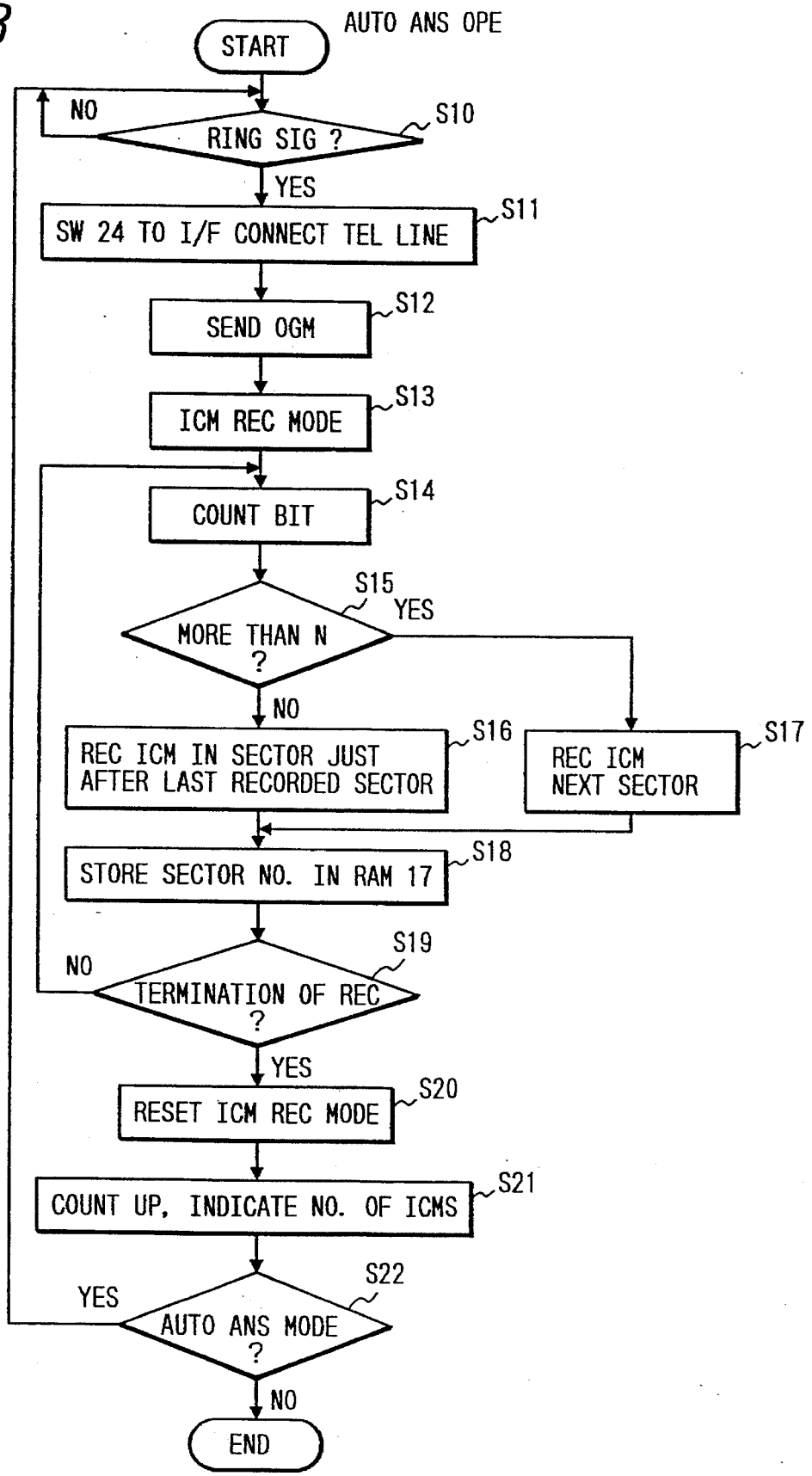
FIG. 3 shows a flow chart of this embodiment showing a program of incoming message recording operation.

An operation of the automatic answering mode will be described. FIG. 3 shows a flow chart of this embodiment showing a program of incoming message recording operation.

In the first step s10, the cpu 9 makes a decision as to whether or not there is the detected ring signal from the ring signal detection circuit 3. If the answer is NO, processing waits the detected ring signal. If the answer is YES, processing proceeds to step s11. In step s11, the cpu 11 turns the switch 24 to the side of the interface circuit 2 to set the apparatus in the out-going message reproducing mode and the cpu 9 connects the telephone line to the interface circuit 2. In the following step s12, the cpu 9 sends the out-going message reproduced for the recording and reproducing circuit 4 to the caller through the telephone line 1 via the interface circuit 2 and the switch 24. This out-going message includes a message requesting a message from a caller at the end of this out-going message.

In the following step s13, the cpu 9 makes the apparatus of this embodiment in the incoming message recording mode, that is, the control circuit 8 turns the switch 23 to the side of the interface circuit 2 and starts the timer circuit 19. In the following step s14, the cpu 9 counts up the number of bits data of the incoming message which has been recorded. In the following step s15, the cpu 9 makes a decision as to whether or not the counted number exceeds a predetermined number N or the counted number corresponds to the predetermined number N, i.e., the counted number reaches an integer times N. If the counted number does not exceeds the predetermined number N or does not corresponds to the predetermined number N, processing proceeds to step s16. In step s16, the cpu 9 stores the sound data indicative of an incoming message from the a/d converter 6 in the sector just after the last recorded sector of the flash EEPROM 16. For example, if the incoming message ICM1 is recorded, the incoming message ICM1 is recorded from the sector a4 not from the sector a3.

In step s15, if the counted number exceeds the predetermined number N or corresponds to the predetermined number N, processing proceeds to step s17. In step s17, the cpu 9 stores the sound data indicative of the incoming message from the a/d converter 6 in the next sector of the flash EEPROM 16.

After step s16 or s17, the cpu 9 stores the sector number in the RAM 17 in step s18. In the following step s19, a decision is made as to whether or not the receiving of the incoming message has been finished by checking the mute detection circuit 22, the timer circuit 19, and the polarity detection circuit 20. The mute detection circuit 22 supplies the mute detection signal to the cpu 9 when the muted condition in the sound signal from the switch 23 for the first predetermined interval, for example five seconds as mentioned above. In response to the mute detection signal, the cpu 9 judges the condition as the termination of recording. If the time interval measured by the timer circuit 19 exceeds a third predetermined interval, the cpu 9 also judges the condition as the termination of recording of the incoming message. Further, the polarity detection circuit 20 detects a change in the polarity of a voltage between telephone line wires of the telephone line 1 and supplies a polarity change detection signal to the cpu 9. When the caller ON-hooked, the polarity detection circuit 20 detects the change in the polarity of voltage between the telephone line wires. In response to the polarity change detection signal, the cpu 9 judges the condition as the termination of recording also. Moreover, if the hook switch 21 is in the off-hook condition, the cpu 9 judges the condition as the termination of recording.. That is, if the user responds the call, the recording of the incoming message should be finished to respond the call. The cpu 9 judges the termination of the recording the incoming message either of these conditions. If the termination of recording of the incoming message is detected, processing proceeds to the following step s20 and the cpu 9 resets the incoming recording mode, namely, the cpu 9 resets the timer 19. Here, if the user responds the call, the user can communicate with the caller through the handset (not shown).

If the recording of the incoming message has not been finished in step s19. Processing returns to step s14 and loops processing from the step s14, s15, s17, s18, and s19 until the recording of the incoming message has been finished.

If the answer is YES in step s19, the cpu resets the incoming message recording mode, that is, the cpu 9 rests the timer circuit 19 in step s20. In the following step s21, the cpu 9 increases a count of incoming message received by one and indicates the count on the indicator 29. In the following step s22, the cpu 9 makes a decision as to whether or not this apparatus is in the automatic answering mode by checking the operation circuit 11. If this apparatus is still in the automatic answering mode, processing returns to step s10. If the answer is NO in step s22, processing ends.

FIG. 5 shows the recording condition of the data recorded in the flash EEPROM 16 as mentioned above. The out-going message is recorded over the sectors a1 and a2 and is recorded in a part of the sector a3. The incoming message ICM1 is recorded from the beginning address of sector a4 to an intermediate address of the sector a5. The incoming message ICM2 is recorded from the beginning address of sector a6 to an intermediate portion of the sector a8. As mentioned, if the recording of a message ends at an intermediate address of a sector, the next message is recorded from the beginning address of the next sector. In the recording operation of messages as mentioned above, sector numbers are recorded in the RAM 17 as shown in FIG. 6. In this embodiment, all of the sector numbers used for each message are recorded. However, it is also possible to record both sector numbers where the recording is started and finished.

An operation of reproducing incoming message will be described.

When the user desires to listen incoming messages, the user operates the operation circuit 11 to set this apparatus in the incoming message reproduction mode. Then, the control circuit 8 sets the apparatus to the incoming message reproducing mode. That is, the control circuit 8 turns the switch 24 to the side of the speaker 18 and reads out data of a desired incoming message from the flash EEPROM 16 with reference to the data indicative of the sectors storing the desired incoming message in the RAM 17. For example, if the incoming message ICM1 is being reproduced, the cpu 9 reads the data of the incoming message from the sectors a4 and a5. Therefore, the flash EEPROM 16 supplies the data of the desired incoming message sequentially to the d/a converter 7. The d/a converter 7 converts the data of the desired incoming message into an analog sound signal and the speaker 18 reproduces the analog sound signal and provides a sound incoming message to the user. The user can listen all incoming messages sequentially and can selectively listen one of incoming message by an operation of the operating circuit 11 with reference to the indicator 29. The indicator 29 informs the user of the an incoming message number, such as ICM1, ICM2, and ICM3, to be reproduced or under reproducing and the user can change the incoming message number by operating the operation circuit 11. In this condition, if the user operates the operation circuit 11 to input a command for reproducing of an incoming message, the cpu 9 reproduces the incoming message indicted on the indicator 29.

An operation of erasing of the incoming message will be described.

Figure 7:
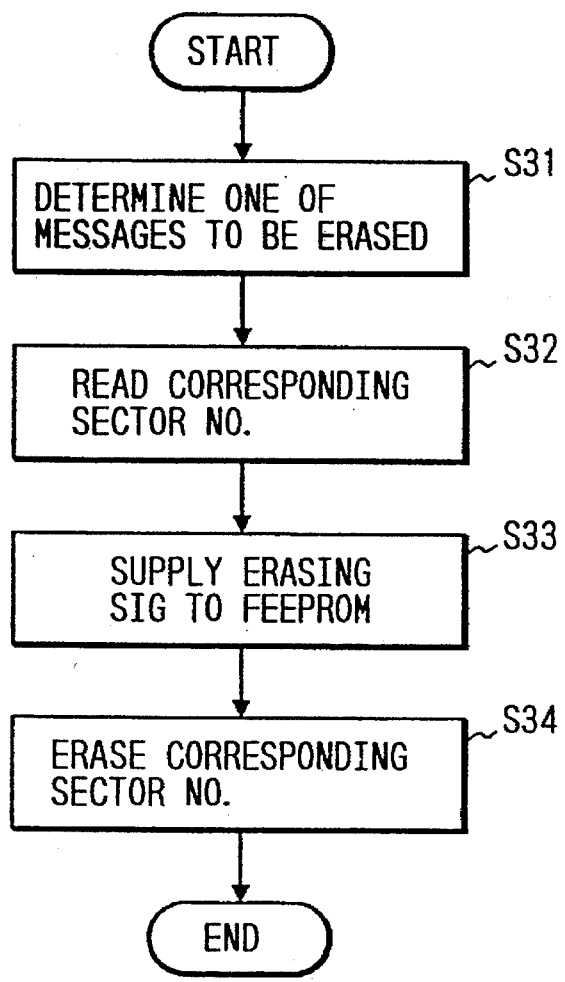
FIG. 7 shows a flow chart of this invention for representing an erasing operation of an incoming message.

FIG. 7 shows a flow chart of this invention for representing an erasing operation of an incoming message.

When the user operates the operation circuit 11 to make this apparatus in the erasing mode, this processing starts. In the first step s31, the cpu 9 determines one of message to be erased. Here, at first, if the incoming message reproducing mode is effected before this erasing mode, the cpu 9 indicates the recently reproduced incoming message number on the indicator 29. If the operator commands the erasing operation in this condition, the cpu 9 determines the incoming message to be erased indicated by the incoming message number. If the user desires to erase other incoming message, the user can changes the incoming message to be erased by operating the operation circuit 11. That is, the cpu 9 changes the incoming message number indicated on the indicator 29 in response to the operation of the user. Then, if the operator commands the erasing operation in this condition, the cpu 9 determines the incoming message to be erased indicated by the incoming message number. If the incoming message reproducing mode was not effected before this processing, the cpu 9 indicates an incoming message number of recently recorded incoming message.

In the following step s32, the cpu 9 reads the sector numbers corresponding to the determined incoming message number from the RAM 17. In the following step s33, the cpu 9 supplies an erasing signal indicative of sector numbers to be erased to the flash EEPROM 16. The flash EEPROM 16 erases data stored in the sectors indicated by the erasing signal. In the following step s34, the cpu 9 erases the corresponding sector numbers stored in the RAM 17 and ends the erasing processing. If the user desires to erase other incoming message, the user can repeat this operation by operating the operation circuit 11.

As mentioned above, according to the first embodiment of this invention, data of an incoming message or out-going message is stored in the flash EEPROM 16 with data divided every data block having a data amount corresponding to the capacity of one sector of the flash EEPROM 16 and the sector numbers corresponding to the incoming messages recorded are stored in the RAM 17. Therefore, each of incoming messages can be reproduced and erased selectively. The RAM 17 has a capacity which is considerably smaller than the flash EEPROM 16, so that the battery 12 has a capacity which is considerably smaller than a battery would be used for backup of a DRAM for storing data of incoming messages.

Figure 8:
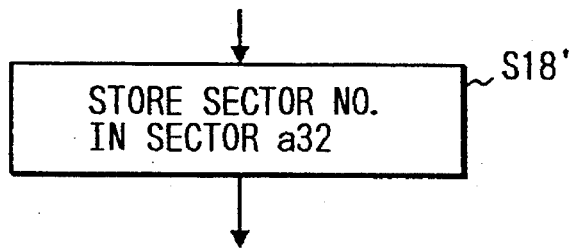
FIG. 8 shows a modification of this embodiment of this invention.

FIG. 8 shows a modification of this embodiment of this invention.

The basic structure and operation are similar to the embodiment as mentioned. The difference is in that in the automatic answering processing shown in FIG. 3, the step s18 is replaced by step s18'. After processing of step s16 or s18, the cpu 9 stores the sector number used to store the message in the sector a32. Then, processing proceeds to the step s19.

Figure 9:
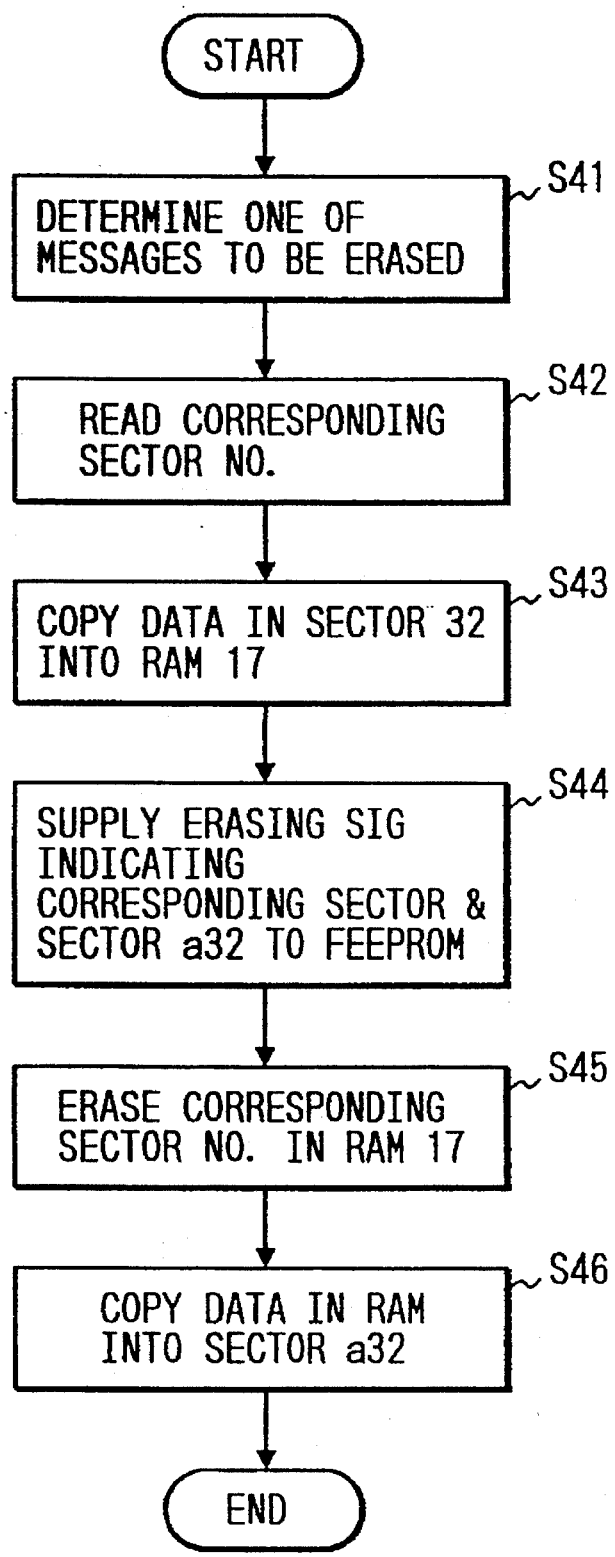
FIG. 9 shows a flow chart of this modification of this embodiment.

FIG. 9 shows a flow chart of this modification of this embodiment for representing an erasing operation of an incoming message.

When the user operates the operation circuit 11 to make this apparatus in the erasing mode, this processing starts. In the first step s41, the cpu 9 determines one of message to be erased. Here, at first, if the incoming message reproducing mode is effected before this erasing mode, the cpu 9 indicates the recently reproduced incoming message number on the indicator 29. If the operator commands the erasing operation in this condition, the cpu 9 determines the incoming message to be erased indicated by the incoming message number. If the user desires to erase other incoming message, the user can changes the incoming message to be erased by operating the operation circuit 11. That is, the cpu 9 changes the incoming message number indicated on the indicator 29 in response to the operation of the user. Then, if the operator commands the erasing operation in this condition, the cpu 9 determines the incoming message to be erased indicated by the incoming message number. If the incoming message reproducing mode was not effected before this processing, the cpu 9 indicates an incoming message number of recently recorded incoming message.

In the following step s42, the cpu 9 reads the sector numbers corresponding to the determined incoming message number from the sector a32. In the following step s43, the cpu 9 copies the data in the sector a32 into the RAM 17 to save the data. In the following step s44, the cpu 9 supplies an erasing signal indicative of sector numbers of a message to be erased and the sector number of the sector a32 to the flash EEPROM 16. The flash EEPROM 16 erases data stored in the sectors indicated by the erasing signal. In the following step s45, the cpu 9 erases the corresponding sector numbers stored in the RAM 17. In the following step s46, the cpu 9 copies the data in the RAM 17 into the sector a32 in the flash EPROM 16 and ends the erasing processing. If the user desires to erase other incoming message, the user can repeat this operation by operating the operation circuit 11.

As mentioned above, the data of sectors used to store messages in the sector a32 is temporally saved in the RAM 17 and then, sectors storing the message to be erased and the sector a32 are erased. After this, the data in the RAM 17 is copied into the sector a32 to restore the data. Therefore, the data of the sector numbers are stored in the FEEPROM 16, so that the battery 12 and the backup circuit 25 can be omitted in this modification. Here, if the capacity of the RAM 17 is smaller than the capacity of one sector of the flash EEPROM 16, a portion of the sector is not used. If the capacity of the RAM 17 is equal to that of one sector, the sector a32 can be used to store data of a portion of an incoming message or the out-going message together with the operational data shown in FIG. 6. In this case, the portion of the incoming message is temporary saved in the RAM 17 also. This makes the capacity for recording message enlarged.

In the embodiment mentioned above, the automatic telephone answering apparatus for sending an out-going message and recording and reproducing an incoming message is described. However, this invention is applicable an automatic answering apparatus provided an entrance of an office or a home for supplying an out-going message to a visitor and recording and reproducing an incoming message from the visitor. In such case, the control circuit 8 supplies the out-going message to the visitor from the speaker 18 by turning the switch 24 to the side of the speaker 18 in response to the operation circuit 11 or a sensor (not shown) for detecting the accessing of the visitor and receiving an incoming message from the visitor via the microphone 14 by turning the switch 28 to the side of the microphone 14. Further, the interface circuit 2 and the polarity detection circuit 20 are omitted.

Figure 10:
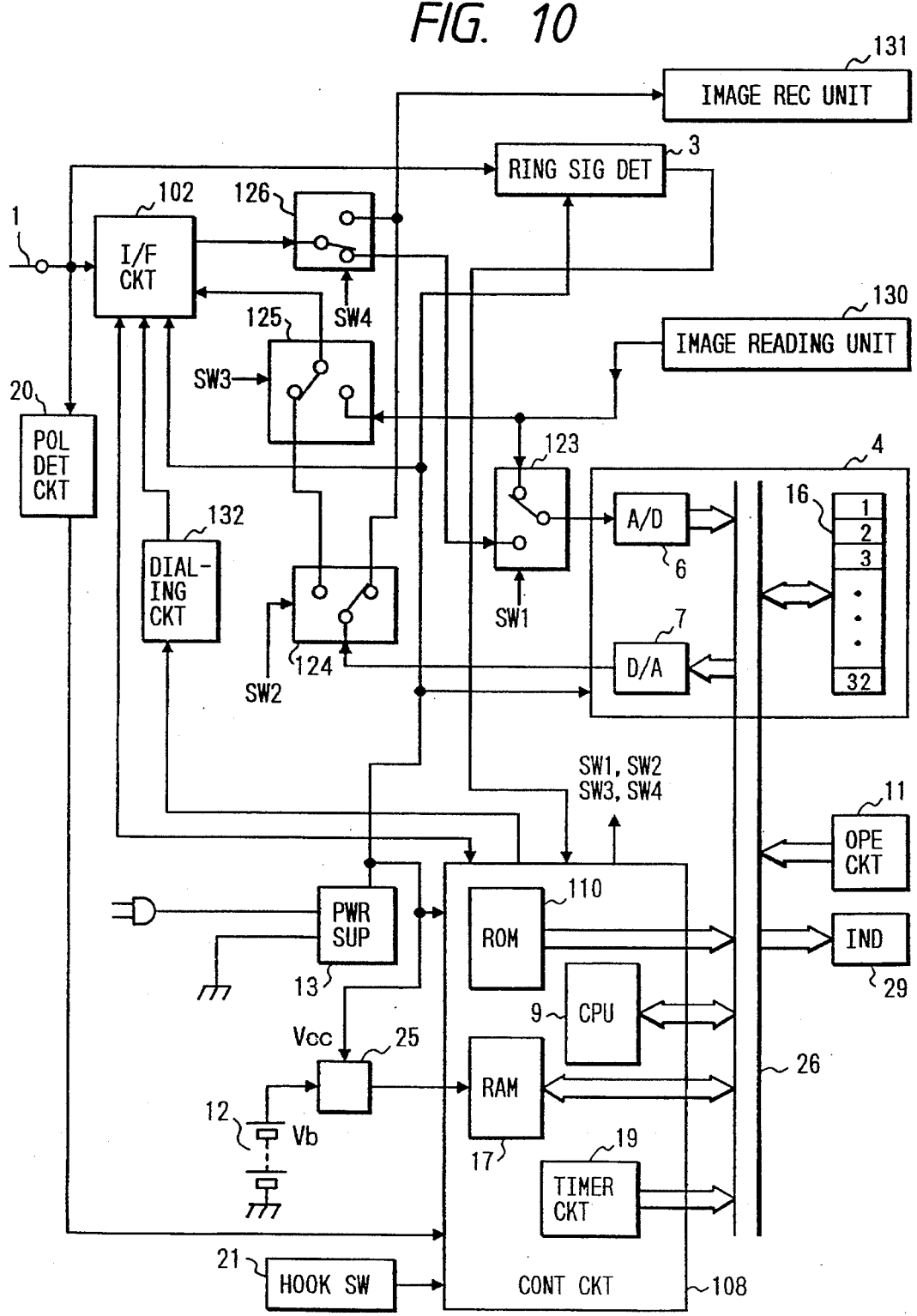
FIG. 10 is a block diagram of a second embodiment of a facsimile apparatus.

FIG. 10 is a block diagram of a second embodiment of a facsimile apparatus as a communication apparatus.

The facsimile apparatus comprises a control circuit 108 having a central processor (cpu) 9, a ROM (read-only memory) 110, a RAM (random access memory) 17, and a timer circuit 19, an interface circuit 102 for communicating with an external facsimile through a telephone line 1, a ring signal detection circuit 3 for detecting a ring signal sent through the telephone line 1, a dialing circuit 132 for generating a dialing signal; a recording and reproducing circuit 4 for recording an out-going image information and incoming image information and for reproducing the out-going information and each of incoming image information, an image reading unit 130 for reading an out-going image information from a copy and supplying it to the recording and reproducing circuit 4 through a switch 123 in an out-going image information recording mode and to the interface circuit 102 through a switch 125 in a normal transmitting mode, an image recording unit 131 for recording an incoming image information from the interface circuit 102 through a switch 126 on a recording paper in a normal receiving mode and incoming image information from the recording and reproducing circuit 4 through a switch 124 in a reproducing mode, the operation circuit 11 for inputting respective commands to the cpu 9, the indicator 29 for indicating operational information and the number of incoming image information received, a polarity detection circuit 20 for detecting a termination of communication by detecting a polarity of the telephone line 1, the power supply circuit 13 for generating a dc supply voltage Vcc to respective circuits in this apparatus, such as the interface circuit 2, the recording/reproducing circuit 4, and the control circuit 108, the backup circuit 25 for supplying the dc supply voltage Vcc or the battery supply voltage Vb from the battery 12, the switch 123 for supplying the image information from the interface circuit 102 or the image reading unit 130 to the recording and reproducing circuit 4, and the switch 124 for supplying the image information from the recording and reproducing circuit 4 to the interface circuit 102 or the image recording unit 131.

In the control circuit 108, the ROM 110 stores a program for operating this apparatus, the RAM 17 stores data for operating this apparatus, the timer circuit 19 for measuring a time interval necessary for the operation of this apparatus. The interface circuit 102 communicates with a facsimile through the telephone line 1, that is, it effects a facsimile procedure with the facsimile and receives incoming or sends out-going image information signal. The ring signal detection circuit 3 detects the incoming ring signal from the telephone line 1 and supplies a detected ring signal to the control circuit 108. The recording and reproducing circuit 4 comprises the a/d converter 6 for converting the sound signal from the switch 123, that is, the incoming image information signal from the interface circuit 102 or the out-going image information from the image reading unit 130, the flash EEPROM 16 for recording an out-going information and incoming image information, and the d/a converter 7 for reproducing the out-going image information and each of incoming image information in cooperation with the flash EEPROM 16. The a/d converter 6, the d/a converter 7, and the flash EEPROM 16, the operation circuit 11, the ROM 110, the RAM 17, the timer circuit 19 are communicates with the cpu 9 through a bus line 26.

In the normal transmission mode, the image information signal generated by the image reading unit 130 is transmitted to another facsimile apparatus (not shown) through the switch 125. The switch 125 is controlled by a switching control signal sw3 produced by the cpu 9. In response to an operation of the operation circuit 11 by an operator, the cpu 9 dials using the dialing circuit 132 and effects a facsimile procedure using the interface circuit 102, controls the switch 125, and generating the image information signal using the image reading unit 130 to transmit the image information.

In the normal receiving mode, the image information signal received by the interface circuit 102 is recorded on a recording paper through the switch 126. The switch 126 is controlled by a switching control signal sw4 produced by the cpu 9. In response to the detected ring signal, the cpu 9 effects a facsimile procedure using the interface circuit 102, controls the switch 126, and records the image information signal using the image recording unit 131 to receive the image information.

In the out-going image information reading mode, the image information signal generated by the image reading unit 130 is supplied to recording and reproducing circuit 4 through the switch 123. The switch 123 is controlled by a switching control signal sw1 produced by the cpu 9. In response to an operation of the operation circuit 11 by the operator, the cpu 9 controls the switch 123, and generating the image information signal using the image reading unit 130 to record the image information in the flash memory 16 as similar to the first embodiment.

In the incoming image information recording mode, the image information signal received by the interface circuit 102 is recorded on the recording and receiving circuit 4 through the switches 123 and 126. The switches 123 and 126 are controlled by switching control signals sw1 and sw4 produced by the cpu 9. In response to the detected ring signal, the cpu 9 effects a facsimile procedure using the interface circuit 102, controls the switches 123 and 126, and records the image information signal from the telephone line in the flash memory 16 as similar to the first embodiment.

In the reproducing mode, the image information signal read from the recording and reproducing circuit 4 is supplied to image recording unit 131 through the switch 124. The switch 124 is controlled by the switching control signal sw2 produced by the cpu 9. In response to an operation of the operation circuit 11 by the operator, the cpu 9 controls the switch 124, and reading the image information signal from the recording and reproducing circuit 4 to reproduce the image information received from another facsimile in the flash memory 16 as similar to the first embodiment.

In the second embodiment, an incoming image information or out-going image information can be stored in the flash EEPROM 16 with data divided every data block having a data amount corresponding to the capacity of one sector of the flash EEPROM 16 and the sector numbers corresponding to the incoming and out-going information recorded are stored in the RAM 17. Therefore, each of incoming information can be reproduced and erased selectively. The RAM 17 has a capacity which is considerably smaller than the flash EEPROM 16, so that the battery 12 has a capacity which is considerably smaller than a battery would be used for backup of a DRAM for storing control data of incoming information.

What is claimed is:

1. A communication apparatus comprising:

a volatile memory for storing data;

a back up power source for maintaining said data in said volatile memory in the presence and absence of an external supply power;

a recording and reproducing portion, having a non-volatile semiconductor memory, for recording information in said non-volatile semiconductor memory and for reproducing said information stored in said non-volatile semiconductor memory, said non-volatile semiconductor memory having a plurality of sectors, each of said sectors having a sector number and a predetermined capacity and being independently erasable; and a recording control portion responsive to a command signal for receiving said information, for detecting an amount of said received information, for operating said recording and reproducing portion to store said information in at least one of said sectors, for detecting each sector number of said at least one of said sectors used to store said information in accordance with said detected amount of said received information, and for storing each detected sector number in said volatile memory.

2. An apparatus as claimed in claim 1, further comprising:

a ring signal detection portion for producing said command signal in response to a ring signal sent from a telephone line; and an interface portion responsive to said command signal for communicating with a telephone line to receive and send said information.

3. An apparatus as claimed in claim 2, further comprising: a reproducing control portion responsive to a reproducing command signal including control data indicative of said information to be reproduced for operating said recording and reproducing portion to reproduce said information to be reproduced from said non-volatile semiconductor memory in accordance with each detected sector number stored in said volatile memory as said control data.

4. An apparatus as claimed in claim 2, further comprising: an erasing control portion responsive to an erasing command signal including control data indicative of said information to be erased for erasing said information to be erased in said non-volatile semiconductor memory in accordance with each detected sector number stored in said volatile memory as said control data.

5. An apparatus as claimed in claim 1, wherein said recording and reproducing portion further comprises an analog to digital converter for recording said information in said non-volatile semiconductor memory and a digital to analog converter for reproducing said information stored in said non-volatile semiconductor memory.

6. An apparatus as claimed in claim 1, further comprising: a reproducing control portion responsive to a reproducing command signal including control data indicative of said information to be reproduced for operating said recording and reproducing portion to reproduce said information from said non-volatile semiconductor memory in accordance with each detected sector number stored in said volatile memory as said reproducing command signal.

7. An apparatus as claimed in claim 1, further comprising: an erasing control portion responsive to an erasing command signal including information indicative of said information to be erased for erasing said information to be erased in said non-volatile semiconductor memory in accordance with each detected sector number stored in said volatile memory as said control data.

8. An apparatus as claimed in claim 1, wherein said information includes sound information.

9. An apparatus as claimed in claim 1, wherein said information includes image information.

10. An apparatus comprising:

interface means for receiving information from a communication line and for transferring information to said communication line;

a volatile memory for storing data;

a back up power source for maintaining said data in said volatile memory in presence and absence of an external supply power;

a recording and reproducing portion, having a non-volatile semiconductor memory, for recording information received by said interface means in said non-volatile semiconductor memory and for reproducing and supplying said information stored in said non-volatile semiconductor memory to said interface means, said non-volatile semiconductor memory having a plurality of sectors, each of said sectors having a sector number, a predetermined storage capacity, a predetermined recording area, and being independently erasable; and a recording control portion responsive to a command signal for receiving said information from said interface means, for detecting an amount of said received information, for operating said recording and reproducing portion to store said information in one of said sectors such that said information is recorded in said non-volatile semiconductor memory from an end address toward another end address of one of said sectors, for detecting each sector number of said at least one of said sectors used to store said information in accordance with said detected amount of said received information, and for storing each detected sector number in said volatile memory.

11. An apparatus as claimed in claim 10, wherein said information includes sound information.

12. An apparatus as claimed in claim 10, wherein said information includes image information.

13. An apparatus comprising:

interface means for receiving information from a communication line and for transferring information to said communication line;

a recording and reproducing portion, having a non-volatile semiconductor memory, for recording information received from said interface means and sector number data in said non-volatile semiconductor memory, and for reproducing and supplying said information stored in said non-volatile semiconductor memory to said interface means, said non-volatile semiconductor memory having a plurality of sectors, each of said sectors having a sector number and a predetermined storage capacity and being independently erasable; and a recording control portion responsive to a command signal for receiving said information from said interface means, for detecting an amount of said received information, for operating said recording and reproducing portion to store said received information in at least one of said sectors except a predetermined sector of said sectors, for detecting each sector number of said at least one of said sectors used to store said information in accordance with said detected data amount, and for storing each detected sector number in said predetermined sector as said sector number data.

14. An apparatus as claimed in claim 13, further comprising: a volatile memory for storing said sector number data; and an erasing control portion responsive to an erasing command signal for copying said sector number data from said predetermined sector into said volatile memory, for determining each sector number of said at least a sector used to store said information to be erased and erasing said information in said non-volatile semiconductor memory using each determined sector number.

15. An apparatus as claimed in claim 13, wherein said information includes sound information.

16. An apparatus as claimed in claim 13, wherein said information includes image information.

17. An apparatus comprising:

interface means for receiving information from a communication line and for transferring information to said communication line;

a recording and reproducing portion, having a non-volatile semiconductor memory, for recording information received from said interface means and sector number data in said non-volatile semiconductor memory, and for reproducing and supplying said information stored in said non-volatile semiconductor memory to said interface means, said non-volatile semiconductor memory having a plurality of sectors, each of said sectors having a sector number, a predetermined storage capacity; and a recording control portion responsive to a command signal for receiving said information from said interface means, for detecting an amount of said received information, for operating said recording and reproducing portion to store said received information in at least one of said sectors except at a predetermined area of a predetermined sector of said sectors, for detecting each sector number of said at least one of said sectors used to store said information in accordance with said detected amount of said received information, and for storing said detected sector number in said predetermined sector at said predetermined area as said sector number data.

18. An apparatus as claimed in claim 17, further comprising: a volatile memory for storing said sector number data and an erasing control portion responsive to an erasing command signal for copying a portion of said information stored in said predetermined sector except said predetermined area and said sector number data from said predetermined area into said volatile memory, determining each sector number for said information to be erased and erasing said information in said non-volatile semiconductor memory using each determined sector number, copying said portion of information and said sector number data from said volatile memory except each determined sector number into said predetermined sector.

19. An apparatus as claimed in claim 17, wherein said information includes sound information.

20. An apparatus as claimed in claim 17, wherein said information includes image information.

21. A communication apparatus comprising:

a volatile memory for storing data;

a back up power source for maintaining said data in said volatile memory in the presence and absence of an external supply power;

a non-volatile semiconductor memory, having a plurality of sectors, each of said sectors having a predetermined capacity and being independently erasable, for storing a plurality of blocks of information; and a recording control portion responsive to a command signal, for receiving one of said plurality of blocks of information, for storing said received one of said plurality of blocks of information in at least one of said plurality of sectors with reference to said data, for detecting said at least one of said sectors used to store said received one of said plurality of blocks of information, and for additionally storing sector data indicative of said detected at least one of said sectors in said volatile memory.

22. A communication apparatus as claimed in claim 21, wherein said non-volatile semiconductor memory comprises an electrically erasable and programmable read only memory.

23. A communication apparatus as claimed in claim 21, wherein each of said sectors has a first and second end address and said recording control portion stores said received one of said plurality of blocks of information in said at least one of said plurality of sectors from said first end address with reference to said data in said volatile memory.

24. An apparatus as claimed in claim 21, further comprising:

a ring signal detection portion for producing said command signal in response to a ring signal sent from a telephone line; and an interface portion responsive to said command signal for communicating with a telephone line to receive said one of said plurality of blocks of information.

25. An apparatus as claimed in claim 21, further comprising an analog to digital converter for analog-to-digital converting said one of said plurality of blocks of information supplied to said non-volatile semiconductor memory.

26. An apparatus as claimed in claim 21, further comprising: a reproducing control portion responsive to a reproducing command signal indicative of one of plurality of blocks of information to be reproduced for reading and reproducing said one of said plurality of blocks of information to be reproduced from said non-volatile semiconductor memory in accordance with said data stored in said volatile memory and said reproducing command signal.

27. An apparatus as claimed in claim 26, further comprising:

a ring signal detection portion for producing said command signal in response to a ring signal sent from a telephone line; and an interface portion responsive to said command signal for communicating with a telephone line to send said reproduced one of said plurality of blocks of information.

28. An apparatus as claimed in claim 26, further comprising a digital to analog converter for digital-to-analog converting an output of said non-volatile semiconductor memory.

29. An apparatus as claimed in claim 21, further comprising: an erasing control portion responsive to an erasing command signal including erasing information indicative of one of said plurality of blocks of said information to be erased for erasing said one of said plurality of blocks of information to be erased in said non-volatile semiconductor memory in accordance with said erasing command signal and for erasing a portion of said data indicative of said erased one of said plurality of block of information in said volatile memory.

30. A communication apparatus comprising:

a non-volatile semiconductor memory, having a plurality of sectors, each of said sectors having a predetermined capacity and being independently erasable, for storing data at a predetermined area of a predetermined sector of said plurality of sectors and a plurality of blocks of information in said plurality of sectors except said predetermined area; and a recording control portion responsive to a command signal, for receiving one of said plurality of blocks of information, for storing said received one of said plurality of blocks of information in at least one of said sectors with reference to said data, for detecting said at least one of said sectors used to store said received one of said plurality of blocks of information, and for additionally storing sector data indicative of said detected at least one of sectors in a predetermined area of a predetermined sectors of said non-volatile semiconductor memory.

31. An apparatus as claimed in claim 30, further comprising:

a ring signal detection portion for producing said command signal in response to a ring signal sent from a telephone line; and an interface portion responsive to said command signal for communicating with a telephone line to receive said one of said plurality of blocks of information.

32. An apparatus as claimed in claim 30, further comprising:

a volatile memory for storing said data and a portion of said plurality of blocks of information from said predetermined sector; and an erasing control portion for storing said portion of said plurality of blocks of information stored in said predetermined sector except said predetermined area and said data from said predetermined area into said volatile memory, for erasing said one of said plurality of blocks of information in said non-volatile memory to be erased in accordance with an erasing command signal indicative of at least one of said plurality of blocks of information in said non-volatile memory to be erased, and for storing said portion of said plurality of blocks of information from said volatile memory and said data from said volatile memory except a portion of said data indicative of said erased one of said plurality of blocks of information in said predetermined sector.

33. A communication apparatus comprising:

a volatile memory for storing data forming a table;

a back up power source for maintaining said data in said volatile memory in the presence and absence of an external supply power;

a non-volatile semiconductor memory, having a plurality of sectors, each of said sectors having a predetermined capacity and being independently erasable, for storing a plurality of blocks of information; and a recording control portion responsive to a command signal, for receiving one of said plurality of blocks of information, for storing said received one of said plurality of blocks of information in at least one of said plurality of sectors with reference to said table, for detecting said at least one of said sectors used to store said received one of said plurality of blocks of information, and for rewriting said data to make said data include sector data indicative of said detected at least one of sectors in said volatile memory.

* * * * *